(12) United States Patent
Stearns et al.

(10) Patent No.: US 10,107,198 B2
(45) Date of Patent: *Oct. 23, 2018

(54) GAS TURBINE ENGINE WITH GEARED TURBOFAN AND OIL THERMAL MANAGEMENT SYSTEM WITH UNIQUE HEAT EXCHANGER STRUCTURE

(71) Applicant: United Technologies Corporation, Hartford, CT (US)

(72) Inventors: Ethan K. Stearns, Lebanon, CT (US); Jorn A. Glahn, Manchester, CT (US); Daniel J. McKaveney, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 565 days.

This patent is subject to a terminal disclaimer.

(21) Appl. No.: 14/761,427

(22) PCT Filed: Mar. 14, 2014

(86) PCT No.: PCT/US2014/027435
§ 371 (c)(1),
(2) Date: Jul. 16, 2015

(87) PCT Pub. No.: WO2015/050579
PCT Pub. Date: Apr. 9, 2015

(65) Prior Publication Data
US 2015/0361887 A1 Dec. 17, 2015

Related U.S. Application Data

(63) Continuation-in-part of application No. PCT/US2013/022360, filed on Jan. 21, 2013.
(Continued)

(51) Int. Cl.
*F02C 7/06* (2006.01)
*F02C 7/14* (2006.01)
(Continued)

(52) U.S. Cl.
CPC .................. *F02C 7/06* (2013.01); *F02C 3/32* (2013.01); *F02C 7/14* (2013.01); *F02C 7/224* (2013.01);
(Continued)

(58) Field of Classification Search
CPC .... F02C 7/06; F02C 7/14; F02C 7/224; F02C 7/36; F02C 3/32; F02C 9/18
See application file for complete search history.

(56) References Cited

U.S. PATENT DOCUMENTS

| 4,041,697 A | 8/1977 | Coffinberry et al. |
| 4,741,152 A | 5/1988 | Burr et al. |

(Continued)

FOREIGN PATENT DOCUMENTS

| EP | 1329617 A2 | 7/2003 |
| EP | 1669551 B1 | 8/2012 |
| WO | 92/11451 A1 | 7/1992 |

OTHER PUBLICATIONS

European Search Report for EP Application No. 13785332.1 dated Jun. 30, 2016.
(Continued)

*Primary Examiner* — Craig Kim
(74) *Attorney, Agent, or Firm* — Carlson, Gaskey & Olds, P.C.

(57) ABSTRACT

An oil supply system for a gas turbine engine has a lubricant pump delivering lubricant to an outlet line. The outlet line is split into at least a hot line and into a cool line, with the hot line directed primarily to locations associated with an engine that are not intended to receive cooler lubricant, and the cool
(Continued)

line directed through one or more heat exchangers at which lubricant is cooled. The cool line then is routed to a fan drive gear system of an associated gas turbine engine. A method and apparatus are disclosed. The heat exchangers include at least an air/oil cooler wherein air is pulled across the air/oil cooler to cool oil. The air/oil cooler is provided with an ejector tapping compressed air from a compressor section to increase airflow across the air/oil cooler.

18 Claims, 3 Drawing Sheets

Related U.S. Application Data

(60) Provisional application No. 61/786,812, filed on Mar. 15, 2013.

(51) Int. Cl.
    *F02C 7/224*     (2006.01)
    *F02C 7/36*     (2006.01)
    *F02C 3/32*     (2006.01)
    *F02C 9/18*     (2006.01)

(52) U.S. Cl.
    CPC ............... *F02C 7/36* (2013.01); *F02C 9/18* (2013.01); *F05D 2260/213* (2013.01); *F05D 2260/601* (2013.01); *Y02T 50/676* (2013.01)

(56) References Cited

U.S. PATENT DOCUMENTS

| | | |
|---|---|---|
| 4,885,911 A | 12/1989 | Woollenweber et al. |
| 6,134,878 A | 10/2000 | Amako et al. |
| 6,282,881 B1 | 9/2001 | Beutin et al. |
| 6,651,441 B2 | 11/2003 | Reuter et al. |
| 7,163,086 B2 | 1/2007 | Care et al. |
| 7,694,505 B2 | 4/2010 | Schilling |
| 7,908,840 B2 | 3/2011 | Schwarz et al. |
| 8,261,527 B1 | 9/2012 | Stearns et al. |
| 2008/0006040 A1 | 1/2008 | Peterson et al. |
| 2010/0275578 A1 | 11/2010 | Schwarz |

OTHER PUBLICATIONS

International Preliminary Report on Patentability for International Application No. PCT/US2014/027435 dated Jul. 30, 2015.
Jane's Aero-Engines, Issue Seven, Copyright 2000, pp. 510-512.
International Search Report and Written Opinion for International Application No. PCT/US13/22360 dated Jan. 10, 2014.
International Search Report and Written Opinion for International Application No. PCT/US14/27435 dated Apr. 28, 2015.
European Search Report for EP Application No. 14851332.8 dated May 3, 2016.

GAS TURBINE ENGINE WITH GEARED TURBOFAN AND OIL THERMAL MANAGEMENT SYSTEM WITH UNIQUE HEAT EXCHANGER STRUCTURE

CROSS REFERENCE TO RELATED APPLICATIONS

This application is a United States National Phase Application of International Application No. PCT/US2014/027435 filed Mar. 14, 2014 which is a continuation in part of International Application No. PCT/US2013/022360 filed Jan. 21, 2013 and claims priority to U.S. Provisional Application No. 61/786,812 filed Mar. 15, 2013.

BACKGROUND

This application relates to an oil system for providing oil to a gear associated with a geared turbofan in a gas turbine engine.

Gas turbine engines are known, and typically include a fan delivering air into a compressor section. Compressed air from the compressor section is delivered into a combustion section, mixed with fuel, and ignited. Products of this combustion pass downstream over turbine rotors which are driven to rotate.

A low pressure turbine rotor drives a low pressure compressor, and traditionally has driven a fan at the same rate of speed.

More recently, a gear reduction has been included between the low pressure turbine and the fan such that the fan and the low pressure compressor can rotate at different speeds.

Oil management systems are known, and typically provide oil to engine bearings and other locations within the engine. As a result of gears being added to turbofan engines, additional components require cooling, thereby necessitating new cooling systems and methodologies.

SUMMARY

A lubricant supply system for a gas turbine engine according to an exemplary embodiment of this disclosure, among other possible things includes a lubricant pump delivering lubricant to an outlet line. The outlet line splits into at least a hot line and a cool line. The hot line is directed primarily to locations associated with an locations within the gas turbine engine not intended to receive cooler lubricant. The cool line is directed through at least one heat exchanger at which lubricant is cooled. The cool line is then routed to at least one component with a temperature capability lower than the locations associated with the gas turbine engine that are not intended to receive cooler lubricant. At least one heat exchanger includes at least an air/oil cooler. Air is pulled across the air/oil cooler to cool lubricant. The air/oil cooler is provided with an ejector tapping compressed air from a compressor section to increase airflow across the air/oil cooler. At least a portion of the lubricant in the cool line passes through a first fuel/oil cooler configured to cool the lubricant using fuel, leading to a combustion section of the associated gas turbine engine, and the lubricant in the hot line not passing through said first fuel/oil cooler.

In a further embodiment of the foregoing system, a valve is positioned on the cool line and splits the cool line into two lines, with a first line being directed through the first fuel/oil cooler at which the lubricant is cooled by fuel leading to a combustion section for the associated gas turbine engine, and the lubricant in the cool line that is not being directed to the fuel/oil cooler but being directed to at least one other cooler through a second line, and, the cool line being split into said two lines at a location downstream of a point where the outlet line is split into the hot line and the cool line.

In a further embodiment of any of the foregoing systems, the at least one other cooler includes the air-to-oil cooler.

In a further embodiment of any of the foregoing systems, a bypass valve selectively bypasses fuel downstream of the fuel/oil cooler back upstream.

In a further embodiment of any of the foregoing systems, the bypass valve alternatively directs the fuel upstream of the first fuel/oil cooler, or downstream of the first fuel/oil cooler.

In a further embodiment of any of the foregoing systems, the at least one other cooler also includes an oil-to-oil cooler at which lubricant from a generator exchanges heat with the lubricant in the second line.

In a further embodiment of any of the foregoing systems, lubricant from the generator is also passed through a second fuel/oil cooler at a location upstream of the first fuel/oil cooler.

In a further embodiment of any of the foregoing systems, a valve selectively supplies lubricant from said hot line to a fan drive gear system.

A gas turbine engine according to an exemplary embodiment of this disclosure, among other possible things includes a fan, a compressor section, including a low pressure compressor section and a high pressure compressor section, a combustor, a turbine section includes both a low pressure turbine and a high pressure turbine section, and the low pressure turbine section driving said low pressure compressor section, and a fan drive gear system provided such that said low pressure turbine further driving the fan, with the fan and the low pressure compressor being driven at different rates. A lubricant system includes a lubricant pump delivering lubricant to an outlet line. The outlet line splits into at least a hot line and into a cool line. The hot line is directed primarily to locations in the gas turbine engine that are not intended to receive cooler lubricant. The cool line is directed through at least one heat exchanger at which the lubricant is cooled. The cool line then being routed to at least one bearing assembly for the fan drive gear system. At least one heat exchanger includes at least an air/oil cooler. Air is pulled across the air/oil cooler to cool lubricant. The air/oil cooler is provided with an ejector tapping compressed air from a compressor section to increase airflow across the air/oil cooler. At least a portion of the lubricant in the cool line passing through a first fuel/oil cooler configured to cool the lubricant using fuel, leading to a combustion section of the associated gas turbine engine, and the lubricant in the hot line not passing through the first fuel/oil cooler.

In a further embodiment of the foregoing gas turbine engine, the locations in the engine that are not intended to receive cooler lubricant include bearings associated with at least the turbine section.

In a further embodiment of any of the foregoing gas turbine engines, a valve is positioned on the cool line and splits the cool line into two lines, with the first line being directed through a first fuel/oil cooler at which the lubricant is cooled by fuel leading to a combustion section for the gas turbine engine, and the lubricant in the cool line that is not being directed to the fuel/oil cooler but being directed to at least one other cooler through a second line and, the cool line being split into two lines at a location downstream of a point where the outlet line is split into the hot line and the cool line.

In a further embodiment of any of the foregoing gas turbine engines, the at least one other cooler includes air-to-oil cooler.

In a further embodiment of any of the foregoing gas turbine engines, a bypass valve selectively bypasses fuel downstream of the fuel/oil cooler back upstream.

In a further embodiment of any of the foregoing gas turbine engines, the bypass valve alternatively directs the fuel upstream of the first fuel/oil cooler, or downstream of the first fuel/oil cooler.

In a further embodiment of any of the foregoing gas turbine engines, the at least one other cooler also includes an oil-to-oil cooler at which lubricant from a generator exchanges heat with the lubricant in the second line.

In a further embodiment of any of the foregoing gas turbine engines, oil from said generator is also passed through a second fuel/oil cooler at a location upstream of said first fuel/oil cooler.

In a further embodiment of any of the foregoing gas turbine engines, the low pressure turbine having a pressure ratio greater than about 5:1, the gear reduction having a ratio of greater than about 2.3, and the fan diameter being significantly larger than a diameter of the low pressure compressor.

A method of managing lubricant supply for a gas turbine engine according to an exemplary embodiment of this disclosure, among other possible things includes moving a lubricant from a main lubricant pump into an outlet line, and splitting the outlet lines into a cool line which is delivered into at least one heat exchanger to cool the lubricant, and the cooled lubricant then being delivered to at least a one component requiring cooler lubricant. Supplying lubricant from a hot line which is not passed through the at least one heat exchanger to bearings associated with at least a turbine section in the gas turbine engine. At least one heat exchanger includes at least an air/oil cooler. Air is pulled across the air/oil cooler to cool lubricant, and the air/oil cooler is provided with an ejector tapping compressed air from a compressor section to increase airflow across the air/oil cooler. Passing at least a portion of the lubricant in the cool line through a first fuel/oil cooler configured to cool the lubricant using fuel, leading to a combustion section of the associated gas turbine engine, and the lubricant in the hot line not passing through the first fuel/oil cooler.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
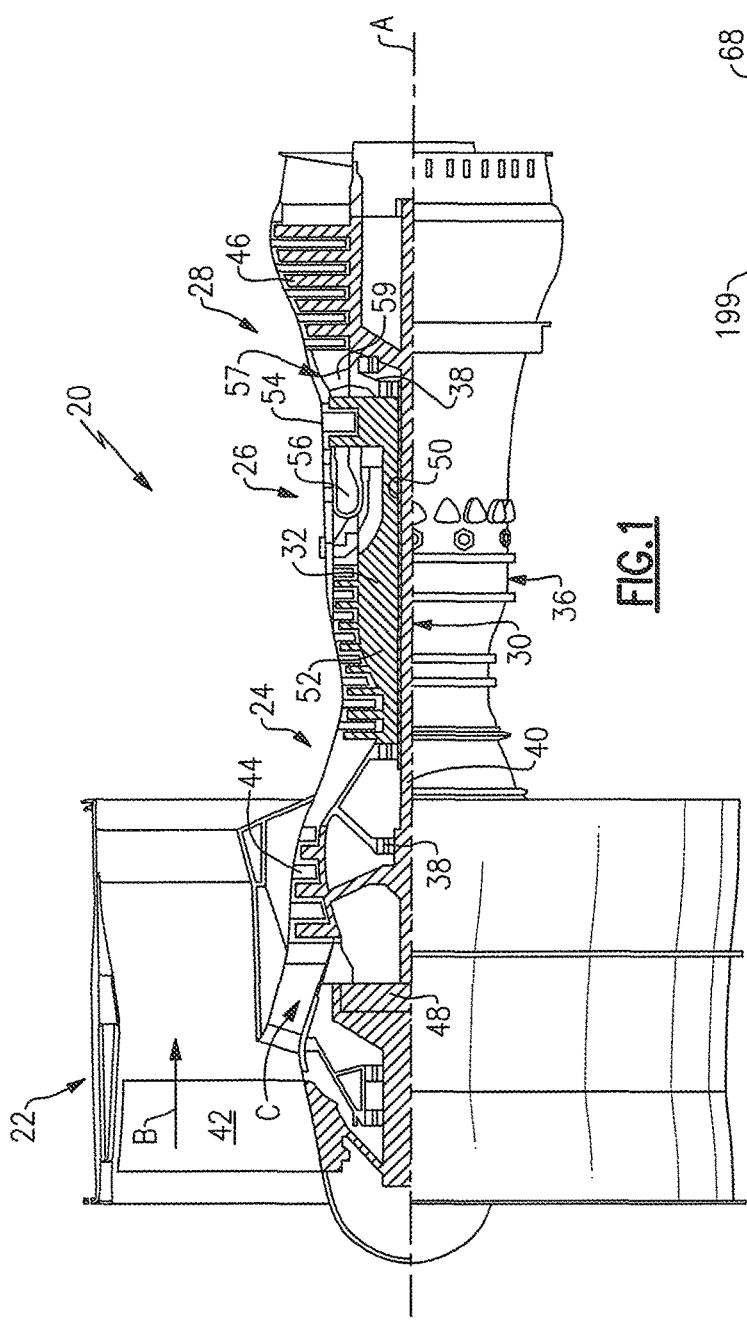
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 (shown schematically) to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the previously mentioned expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as bucket cruise Thrust Specific Fuel Consumption ("TSFC"). TSFC is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
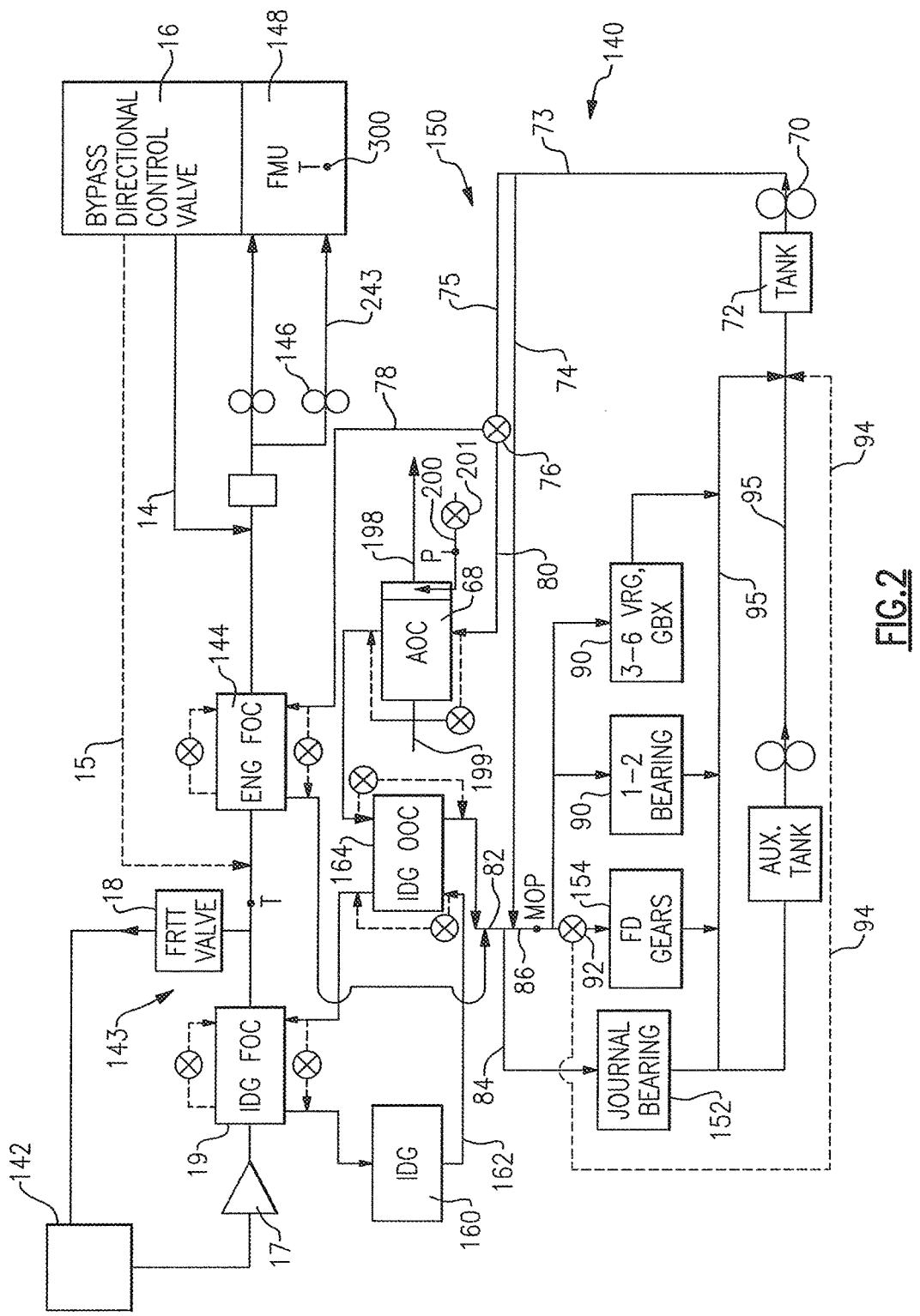
FIG. 2 is a schematic of an embodiment of an oil management system for the gas turbine engine of FIG. 1.

FIG. 2 illustrates an oil management system for the gas turbine engine system of FIG. 1. The oil management system 140 is utilized in association with a fuel system 143, and an integrated drive generator ("IDG") 160 and its oil cooling system circuit 162.

Fuel from a fuel tank 142 passes to a fuel/oil cooler 144. The fuel is heated, and cools a lubricant, as will be explained below. A main fuel pump 146 drives the fuel into further fuel lines 243 and then into a fuel management unit ("FMU") 148 associated with a combustor, such as combustor 26 as shown in FIG. 1. It is known in the art to heat the fuel to improve the efficiency of the overall engine. The fuel/oil cooler 144 provides this function.

At the same time, the IDG 160 is driven by turbine rotors to generate electricity for various uses on an aircraft. As shown in oil cooling system circuit 162, the oil from IDG 160 passes through an oil-to-oil cooler 164, and may also thereafter pass through a fuel oil cooler 19 before returning to the integrated drive generator 160.

A boost pump 17 may drive the fuel from the tank 142 through the fuel oil cooler 19 to heat the fuel, and cool the oil being returned to the generator 160. A valve 18 may selectively return fuel to the fuel tank 142. As also shown, a bypass directional control valve 16 selectively bypasses fuel away from the FMU 148 to either upstream or downstream of the engine FOC (144). The main fuel pump 146 may be a fixed displacement pump. As shown, the fuel may be returned through a line 15 to a location upstream of the fuel oil cooler 144 under certain conditions, low power for example. On the other hand, under other conditions, such as high power, the fuel is delivered through a line 14 to a location downstream of the fuel oil cooler. Since the fuel in either line 14 or 15 has already been heated, it may be necessary to provide more cooling to the oil, and thus an improved air/oil cooler 68 is utilized, and will be explained below.

An oil supply system 150 includes a main oil pump 70 taking oil from a main oil tank 72. The terms "oil" and "lubricant" are used interchangeably in this application and cover a fluid used to lubricate surfaces subject to relative rotation or to extract heat from stationary and rotating engine components. The oil is delivered through a downstream line 73, and split between two lines 74 and 75. Line 74 is sent directly to line 86 without cooling. A modulating valve 76 is controlled to achieve a desired fuel temperature as a function of the oil flow in line 75. As an example, a sensor 300 may send a signal to a control regarding a sensed temperature of the fuel downstream of the fuel oil cooler 144. The valve 76 routes the volume of oil between line 78 and 80 to achieve the desired temperature of the fuel.

The oil passing to line 78 passes through the fuel/oil cooler 144 and heats the fuel. The oil is cooled before returning to a common downstream line 82. The downstream line 82 could be called a "cool" oil line, as the oil will be cooler than the oil in "hot" line 74 which has not been cooled in any heat exchanger. For purposes of this application, line 75 is seen as part of the "cool" line even though the lubricant has yet to be cooled.

The oil directed by the valve 76 into line 80 passes through an air-to-oil cooler at 68 which is exposed to air which is cooler than the oil in line 80, and which cools the oil. Downstream of the air-to-oil cooler 68, the oil passes through the oil-to-oil cooler 164, and may actually be somewhat heated by cooling the oil for the IDG. Still, the oil reaching line 82 downstream of the oil-to-oil cooler 164 will be significantly cooler than the oil in line 74. Some of the oil in line 82 is directed through a line 84, to a bearing 152, which is part of the gear reduction 48 (see FIG. 1). Thus, cooler oil is supplied to the bearing 152 than is supplied from the line 74. As can be seen, a line 86 branches off of the "cool" line 82 at or near the point at which "cool" line 84 breaks away to go to the bearing 152. The lubricant in line 86 mixes with the lubricant in "hot" line 74, but downstream of the branch line 84. As shown, the fan drive gears 154 receive "hot" oil. On the other hand, the fan drive gears 154 may be placed to receive the cooler oil. The bearing 152 may include a bearing assembly for supporting rotation of a gear. The bearing assembly may include roller bearings such as ball, cylinder or any other roller bearing configuration that supports rotation. The bearing 152 may also be configured as a journal bearing.

It is desirable to provide cooler oil to these locations than is necessary to be supplied to bearings 90, or other locations associated with the engine. The bearings 90 as shown in FIG. 2 may equate to the several locations of bearings 38 as shown in FIG. 1.

On the other hand, cooling all of the oil associated with the engine bearings 90 would reduce the overall efficiency of the engine. Thus, splitting the oil, and cooling the oil to be directed to the bearing 152 provides cooler oil to those locations, while still allowing the hotter oil to be directed to locations that do not need cooler oil.

In addition, a valve 92 can selectively direct additional oil to the gears 154 if additional oil is necessary, such as at high power times. At other times, the valve 92 may direct lubricant through line 94 back to a return line 95 leading back to the oil tank 72.

The overall configuration thus results in an oil supply system which directs hotter oil to the locations which do not need cooler oil, but which also cools oil to be directed to areas associated with the fan drive gear.

Further details of a similar oil management system are disclosed in co-pending U.S. patent application Ser. No. 13/361,997, entitled "Gas Turbine Engine With Geared Turbofan and Oil Thermal Management System, owned by the assignee of the present application.

The differences between the present application and the above referenced application largely relate to the inclusion in the system of the bypass valve 16. Since fuel which has already been heated is returned by the bypass valve 16, there is more of a cooling load on the oil in the engine fuel oil cooler. Since the bypass valve 16 is returning fuel which has already been heated to locations upstream of the FMU, and temperature sensor 300, it is possible that less heating of the fuel, and subsequently less cooling of the oil will occur in the fuel oil cooler. Thus, the cooling load on the air/oil cooler 68 may be higher. For that reason, an ejector 198 is included, and a tap to a compressor source 200 (e.g., the sixth stage of the compressor section, for example, such as shown in FIG. 1) may tap high pressure air through the ejector 198 to draw additional air into a duct 199, shown schematically, and across the air/oil cooler 68. This will increase the amount of cooling of the oil in the air/oil cooler 68, and ensure the oil reaching line 82 is sufficiently cool to be sent to the bearing 152.

The use of the fuel oil cooler 19 also heats the fuel, and thus reduces the potential for adequately cooling the oil in the fuel/oil cooler 144 on its own. This again points to the use of the improved air/oil cooler.

Figure 3:
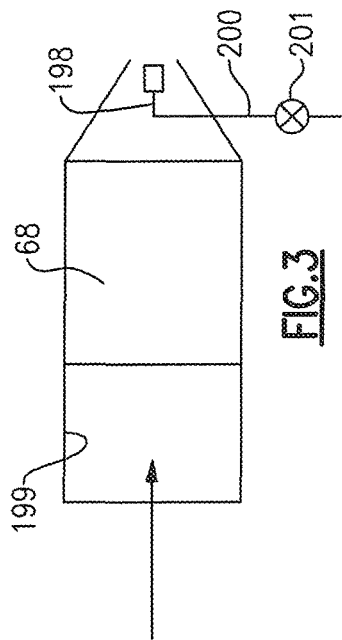
FIG. 3 shows an embodiment of an air/oil cooler used in the oil management system of FIG. 2.

FIG. 3 schematically shows further details of the air/oil cooler 68. As shown, a duct 199 bleeds air across the air/oil cooler 68. An ejector tap 198 from a source of compressed air 200, increases the flow of air to achieve adequate cooling of the oil. A valve 201 selectively controls this ejector flow.

The air/oil cooler is not in series with the fuel/oil cooler, however by further cooling the oil, when it is intermixed, it will be able to compensate for the hotter oil from the fuel/oil cooler 144.

Figure 4:
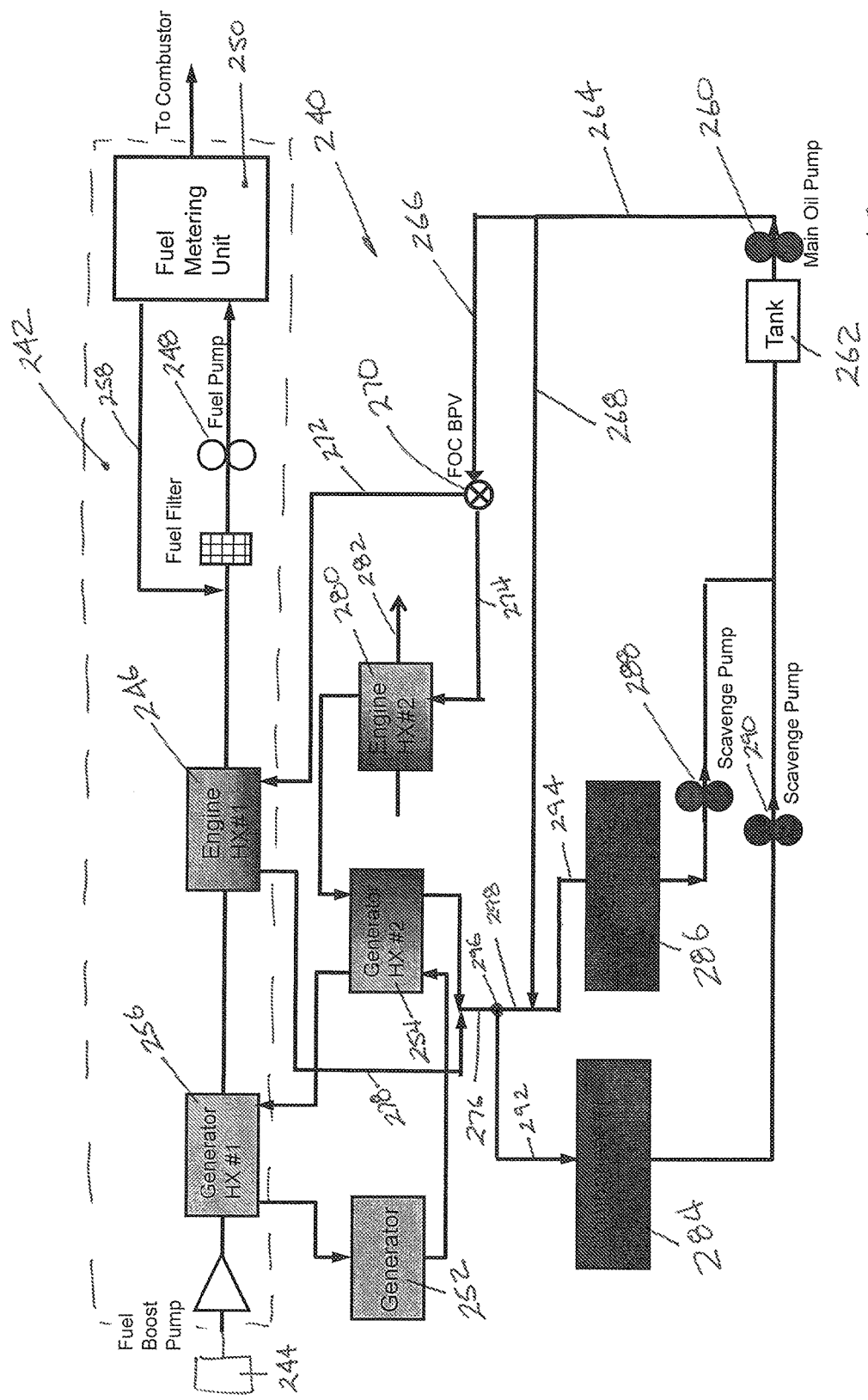
FIG. 4 is a schematic view of another example oil management system for the gas turbine engine of FIG. 1.

Referring to FIG. 4, another oil management system 240 is shown schematically and cooperates with a fuel system 242. Similar to the previous embodiment, the fuel system 242 includes a fuel pump 248 that draws fuel from a fuel tank 244 to a fuel metering unit 250. A portion of fuel to the fuel metering unit 250 is recirculated back to a point before the fuel pump 248. Fuel through the fuel system 242 is circulated through a generator heat exchanger 256 and an engine heat exchanger 246. Each of the generator heat exchanger 256 and the engine heat exchanger 246 are fuel/oil heat exchangers that cool lubricant by rejecting heat from the lubricant into the fuel.

The oil management system includes a main pump 260 that draws lubricant from a tank 262 and pumps the lubricant through specific conduits to locations and components that require lubrication. As is understood from explanations provided above, lubricant from the tank 262 is routed through a main line 264 and then is split into a cool circuit through line 266 and a hot circuit through line 268. Lubricant through the cool circuit is routed to a modulating valve 270 where lubricant is split between the engine heat exchanger 246 and the air/oil cooler indicated at 280. The modulating valve 270 is provided to control a volume of lubricant flow to the engine heat exchanger 246 to achieve a desired temperature in the fuel. Lubricant routed to the air/oil heat exchanger 280 cools the lubricant to a desired temperature with airflow 282.

Lubricant exiting the air/oil heat exchanger 280 is routed a generator heat exchanger 254. The generator heat exchanger 280 is an oil/oil heat exchanger transferring heat between lubricant communicated from the generator 252. Accordingly, the lubricant from the air/oil heat exchanger 280 is heated as it proceeds through the generator heat exchanger 254 and accepts heat from lubricant flowing from the generator 252. The lubricant from the generator heat exchanger is 254 is then further cooled by being circulated through the fuel/oil heat exchanger 256.

Lubricant from the engine fuel/oil heat exchanger 246 and the generator heat exchanger 254 is mixed into a cool lubricant return line 276. A second cool lubricant line 292 is in communication with the line 276 and receives relatively cool lubricant that is transmitted and utilized by components that require cooler lubricant indicated at 284. Components that require cooler lubricant can include bearing assemblies within the fan drive gear system 58 including roller and journal bearings. Moreover, other components may require cooler lubricant due to material thermal limits and also sliding components may require lubricant sufficiently cooled to correspond with a desired thermal compatibility and/or location. A point indicated at 298 is above or upstream from the point where relatively warmer lubricant is supplied through line 268. Accordingly, the warmer lubricant is not mixed with the cooler lubricant in the line 292 to the components 284.

Lubricant through the line 268 substantially bypasses all of the heat exchangers and is therefore at a higher temperature than the lubricant within the line 292. The relatively warmer lubricant is passed to components that do not require cooler lubricant indicated at 286. In this example, components that do not require cooler lubricant can include gears within the fan drive gears (FIG. 2), bearings 38 disposed through the engine to support rotation of the shafts 30, 50 (FIG. 1) and other rotating components.

Accordingly, the example system 240 provides cooler lubricant to those components 284 that require lower temperature lubricant and does not cool lubricant provided to those components not require cool lubricant to increase overall engine efficiency and performance.

Although an embodiment of this disclosure has been explained, a worker of ordinary skill in this art would recognize that certain modifications would come within the scope of this invention. For that reason, the following claims should be studied to determine the true scope and content of this invention.

The invention claimed is:

1. A lubricant supply system for a gas turbine engine comprising:
a lubricant pump delivering lubricant to an outlet line, said outlet line splitting into at least a hot line and a cool line, said hot line being directed primarily to locations associated within the gas turbine engine not intended to receive cooler lubricant, and said cool line being directed through at least one heat exchanger at which lubricant is cooled, and said cool line then being routed to at least one component that requires cooler lubricant than the locations associated within the gas turbine engine that are not intended to receive cooler lubricant;
said at least one heat exchanger including at least an air/oil cooler wherein air is pulled across said air/oil cooler to cool lubricant, and said air/oil cooler being provided with an ejector tapping compressed air from a compressor section to increase airflow across the air/oil cooler; and
at least a portion of the lubricant in said cool line passing through a first fuel/oil cooler configured to cool the lubricant using fuel, leading to a combustion section of the associated gas turbine engine, and the lubricant in said hot line not passing through said first fuel/oil cooler.

2. The system as set forth in claim 1, wherein a valve is positioned on said cool line and splits said cool line into two lines, with a first line being directed through said first fuel/oil cooler at which the lubricant is cooled by fuel leading to a combustion section for the associated gas turbine engine, and the lubricant in the cool line that is not being directed to the fuel/oil cooler but being directed to at least one other cooler through a second line, and, said cool line being split into said two lines at a location downstream of a point where said outlet line is split into said hot line and said cool line.

3. The system as set forth in claim 2, wherein said at least one other cooler includes said air-to-oil cooler.

4. The system as set forth in claim 3, wherein a bypass valve selectively bypasses fuel downstream of said fuel/oil cooler back upstream.

5. The system as set forth in claim 4, wherein said bypass valve alternatively directs the fuel upstream of the first fuel/oil cooler, or downstream of the first fuel/oil cooler.

6. The system as set forth in claim 5, wherein said at least one other cooler also includes an oil-to-oil cooler at which lubricant from a generator exchanges heat with the lubricant in said second line.

7. The system as set forth in claim 6, wherein lubricant from said generator is also passed through a second fuel/oil cooler at a location upstream of said first fuel/oil cooler.

8. The system as set forth in claim 1, wherein a valve selectively supplies lubricant from said hot line to a fan drive gear system.

9. A gas turbine engine comprising:
a fan, a compressor section, including a low pressure compressor section and a high pressure compressor section;
a combustor;
a turbine section including both a low pressure turbine and a high pressure turbine section, and said low pressure turbine section driving said low pressure compressor section; and
a fan drive gear system provided such that said low pressure turbine further driving said fan, with said fan and said low pressure compressor being driven at different rates;
a lubricant system including a lubricant pump delivering lubricant to an outlet line, said outlet line splitting into at least a hot line and into a cool line, said hot line being directed primarily to locations in the gas turbine engine that are not intended to receive cooler lubricant, and said cool line being directed through at least one heat exchanger at which the lubricant is cooled, and said cool line then being routed to at least one bearing assembly for said fan drive gear system; and
said at least one heat exchanger including at least an air/oil cooler wherein air is pulled across said air/oil cooler to cool lubricant, and said air/oil cooler being provided with an ejector tapping compressed air from a compressor section to increase airflow across the air/oil cooler; and
at least a portion of the lubricant in said cool line passing through a first fuel/oil cooler configured to cool the lubricant using fuel, leading to a combustion section of the associated gas turbine engine, and the lubricant in said hot line not passing through said first fuel/oil cooler.

10. The gas turbine engine as set forth in claim 9, wherein said locations in the engine that are not intended to receive cooler lubricant include bearings associated with at least the turbine section.

11. The gas turbine engine as set forth in claim 9, wherein a valve is positioned on said cool line and splits said cool line into two lines, with said first line being directed through a first fuel/oil cooler at which the lubricant is cooled by fuel leading to a combustion section for the gas turbine engine, and the lubricant in the cool line that is not being directed to the fuel/oil cooler but being directed to at least one other cooler through a second line and, said cool line being split into said two lines at a location downstream of a point where said outlet line is split into said hot line and said cool line.

12. The gas turbine engine as set forth in claim 11, wherein said at least one other cooler includes said air-to-oil cooler.

13. The gas turbine engine as set forth in claim 12, wherein a bypass valve selectively bypasses fuel downstream of said fuel/oil cooler back upstream.

14. The gas turbine engine as set forth in claim 13, wherein said bypass valve alternatively directs the fuel upstream of the first fuel/oil cooler, or downstream of the first fuel/oil cooler.

15. The gas turbine engine as set forth in claim 13, wherein said at least one other cooler also includes an oil-to-oil cooler at which lubricant from a generator exchanges heat with the lubricant in said second line.

16. The gas turbine engine as set forth in claim 15, wherein oil from said generator is also passed through a second fuel/oil cooler at a location upstream of said first fuel/oil cooler.

17. The gas turbine engine as set forth in claim 9, wherein said low pressure turbine having a pressure ratio greater than about 5:1, said gear reduction having a ratio of greater than about 2.3, and said fan diameter being significantly larger than a diameter of said low pressure compressor.

18. A method of managing lubricant supply for a gas turbine engine comprising the steps of:
moving a lubricant from a main lubricant pump into an outlet line, and splitting the outlet lines into a cool line which is delivered into at least one heat exchanger to cool the lubricant, and the cooled lubricant then being delivered to at least a one component requiring cooler lubricant;
supplying lubricant from a hot line which is not passed through said at least one heat exchanger to bearings associated with at least a turbine section in the gas turbine engine; said at least one heat exchanger including at least an air/oil cooler wherein air is pulled across said air/oil cooler to cool lubricant, and said air/oil cooler being provided with an ejector tapping compressed air from a compressor section to increase airflow across the air/oil cooler; and
passing at least a portion of the lubricant in the cool line through a first fuel/oil cooler configured to cool the lubricant using fuel, leading to a combustion section of the associated gas turbine engine, and the lubricant in said hot line not passing through said first fuel/oil cooler.

* * * * *